US011303212B2

United States Patent
Chen et al.

(10) Patent No.: US 11,303,212 B2
(45) Date of Patent: Apr. 12, 2022

(54) PEAK-BUCK PEAK-BOOST CURRENT-MODE CONTROL FOR SWITCHED STEP-UP STEP-DOWN REGULATORS

(71) Applicant: Analog Devices International Unlimited Company, Limerick (IE)

(72) Inventors: Min Chen, Southgate (GB); Bryan Avery Legates, Los Altos, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/220,622

(22) Filed: Apr. 1, 2021

(65) Prior Publication Data

US 2021/0226535 A1   Jul. 22, 2021

Related U.S. Application Data

(63) Continuation of application No. 14/660,739, filed on Mar. 17, 2015, now abandoned.

(60) Provisional application No. 62/088,433, filed on Dec. 5, 2014.

(51) Int. Cl.
  *H02M 3/158* (2006.01)
(52) U.S. Cl.
  CPC ................. *H02M 3/1582* (2013.01)
(58) Field of Classification Search
  CPC .... H02M 3/1582; H02M 3/158; H02M 3/157; H02M 3/1563; H02M 3/156
  See application file for complete search history.

(56) References Cited

U.S. PATENT DOCUMENTS

| 5,402,060 | A | * | 3/1995 | Erisman | .................... G05F 1/62 |
| | | | | | 323/268 |
| 6,037,755 | A | | 3/2000 | Mao et al. | |
| 6,087,816 | A | | 7/2000 | Volk | |
| 6,166,527 | A | | 12/2000 | Dwelley et al. | |
| 6,275,016 | B1 | | 8/2001 | Ivanov | |
| 6,348,779 | B1 | | 2/2002 | Sluijs | |
| 6,788,033 | B2 | * | 9/2004 | Vinciarelli | .......... H02M 3/1582 |
| | | | | | 323/225 |

(Continued)

FOREIGN PATENT DOCUMENTS

| CN | 101499718 A | 8/2009 |
| CN | 108054918 B | 4/2020 |

(Continued)

OTHER PUBLICATIONS

U.S. Appl. No. 17/167,548, filed Feb. 4, 2021, Peak Current Mode Control for Buck-Boost Regulators.

(Continued)

*Primary Examiner* — Nguyen Tran
(74) *Attorney, Agent, or Firm* — Schwegman Lundberg & Woessner, P.A.

(57) ABSTRACT

A peak-buck peak-boost current mode control structure and scheme for a synchronous four-switch and non-synchronous two-switch buck-boost regulators sense input and output voltages to smoothly transition between buck mode, buck-boost mode, and boost mode for high power efficiency and low output ripples. With the inductor current sensing, the control scheme achieves the best performance in continuous conduction and discontinuous condition mode operations.

19 Claims, 16 Drawing Sheets

(56) References Cited

U.S. PATENT DOCUMENTS

| | | |
|---|---|---|
| 6,812,676 B2 | 11/2004 | Tateishi |
| 7,106,035 B2 | 9/2006 | Xing |
| 7,116,085 B2 | 10/2006 | Ikezawa |
| 7,196,499 B1 | 3/2007 | Lipcsei |
| 7,256,570 B2 | 8/2007 | Zhou et al. |
| 7,298,119 B1 | 11/2007 | Amram Summit et al. |
| 7,394,231 B2 | 7/2008 | Flatness et al. |
| 7,872,456 B2 | 1/2011 | Li et al. |
| 8,143,865 B2 | 3/2012 | Grant |
| 8,179,113 B2 | 5/2012 | Singnurkar |
| 8,415,937 B2 | 4/2013 | Hester |
| 8,436,591 B2 | 5/2013 | Dearn |
| 8,723,490 B2 | 5/2014 | Moussaoui et al. |
| 8,928,302 B2 | 1/2015 | Namekawa |
| 9,088,211 B2 | 7/2015 | Ivanov et al. |
| 9,425,692 B2 | 8/2016 | Bernon-enjalbert et al. |
| 9,647,557 B2 | 5/2017 | Milanesi et al. |
| 9,882,489 B2 | 1/2018 | Li |
| 10,075,075 B2 | 9/2018 | Zhang |
| 10,122,168 B2 | 11/2018 | Goncalves et al. |
| 10,355,596 B2 | 7/2019 | Choquet |
| 10,651,722 B2 | 5/2020 | Yang et al. |
| 2006/0055384 A1 | 3/2006 | Jordan et al. |
| 2006/0284606 A1 | 12/2006 | Chen et al. |
| 2009/0108823 A1 | 4/2009 | Ho et al. |
| 2010/0052611 A1 | 3/2010 | Lyle, Jr. |
| 2011/0169466 A1 | 7/2011 | Kuan et al. |
| 2011/0187336 A1 | 8/2011 | Wu et al. |
| 2011/0199062 A1 | 8/2011 | Singnurkar |
| 2011/0227550 A1 | 9/2011 | Walters et al. |
| 2011/0279098 A1 | 11/2011 | Ren et al. |
| 2012/0176824 A1 | 7/2012 | Franklin et al. |
| 2014/0084833 A1 | 3/2014 | Aghili |
| 2014/0084883 A1 | 3/2014 | Tanabe |
| 2014/0217996 A1 | 8/2014 | Peker et al. |
| 2014/0354250 A1 | 12/2014 | Deng |
| 2015/0162835 A1 | 6/2015 | Hang |
| 2016/0164411 A1 | 6/2016 | Chen et al. |
| 2019/0326814 A1 | 10/2019 | Cho et al. |

FOREIGN PATENT DOCUMENTS

| | | |
|---|---|---|
| EP | 1689070 A2 | 8/2006 |
| EP | 3002860 A1 | 4/2016 |
| EP | 3002861 A1 | 4/2016 |
| EP | 3002860 B1 | 6/2020 |
| WO | WO-2012109680 A2 | 8/2012 |

OTHER PUBLICATIONS

U.S. Appl. No. 14/660,739, filed Mar. 17, 2015, Peak-Buck Peak-Boost Current-Mode Control for Switched Step-Up Step-Down Regulators.

"U.S. Appl. No. 14/660,739, Advisory Action dated Feb. 14, 2017", 3 pgs.

"U.S. Appl. No. 14/660,739, Advisory Action dated Apr. 12, 2019", 3 pgs.

"U.S. Appl. No. 14/660,739, Advisory Action dated Jun. 14, 2018", 3 pgs.

"U.S. Appl. No. 14/660,739, Advisory Action dated Oct. 12, 2017", 3 pgs.

"U.S. Appl. No. 14/660,739, Appeal Brief filed Jun. 14, 2019", 11 pgs.

"U.S. Appl. No. 14/660,739, Appeal Decision mailed Feb. 1, 2021", 8 pgs.

"U.S. Appl. No. 14/660,739, Applicant's Summary of Examiner Interview filed Mar. 7, 2018", 1 pg.

"U.S. Appl. No. 14/660,739, Examiner Interview Summary dated Feb. 6, 2018", 3 pgs.

"U.S. Appl. No. 14/660,739, Final Office Action dated Jan. 17, 2019", 33 pgs.

"U.S. Appl. No. 14/660,739, Final Office Action dated Apr. 5, 2018", 30 pgs.

"U.S. Appl. No. 14/660,739, Final Office Action dated Aug. 3, 2017", 30 pgs.

"U.S. Appl. No. 14/660,739, Final Office Action dated Nov. 30, 2016", 23 pgs.

"U.S. Appl. No. 14/660,739, Non Final Office Action dated Apr. 10, 2017", 28 pgs.

"U.S. Appl. No. 14/660,739, Non Final Office Action dated Jun. 30, 2016", 19 pgs.

"U.S. Appl. No. 14/660,739, Non Final Office Action dated Jul. 24, 2018", 30 pgs.

"U.S. Appl. No. 14/660,739, Non Final Office Action dated Nov. 3, 2017", 27 pgs.

"U.S. Appl. No. 14/660,739, Response filed Jan. 30, 2017 to Final Office Action dated Nov. 30, 2016", 15 pgs.

"U.S. Appl. No. 14/660,739, Response filed Jan. 30, 2018 to Non Final Office Action dated Nov. 3, 2017", 18 pgs.

"U.S. Appl. No. 14/660,739, Response filed Mar. 23, 2017 to Advisory Action dated Feb. 14, 2017", 15 pgs.

"U.S. Appl. No. 14/660,739, Response filed May 21, 2018 to Final Office Action dated Apr. 5, 2018", 13 pgs.

"U.S. Appl. No. 14/660,739, Response filed Jun. 29, 2017 to Non Final Office Action dated Apr. 10, 2017", 16 pgs.

"U.S. Appl. No. 14/660,739, Response filed Jul. 2, 2018 to Advisory Action dated Jun. 14, 2018", 15 pgs.

"U.S. Appl. No. 14/660,739, Response filed Sep. 30, 2017 to Final Office Action dated Aug. 3, 2017", 16 pgs.

"U.S. Appl. No. 14/660,739, Response filed Oct. 24, 2018 to Non Final Office Action dated Jul. 24, 2018", 14 pgs.

"U.S. Appl. No. 14/660,739, Response filed Oct. 29, 2016 to Non Final Office Action dated Jun. 30, 2016", 14 pgs.

"U.S. Appl. No. 14/660,739 Response to Final Office Action filed on Apr. 2, 2019", 14 pgs.

"European Application Serial No. 15002058.4, Communication pursuant to Article 94(3) EPC dated Jun. 26, 2017", 6 pgs.

"European Application Serial No. 15002058.4, Communication Pursuant to Article 94(3) EPC dated Jul. 2, 2019", 11 pgs.

"European Application Serial No. 15002058.4, Extended European Search Report dated Mar. 3, 2016", 7 pgs.

"European Application Serial No. 15002058.4, Response filed Oct. 6, 2016 to Extended European Search Report dated Mar. 3, 2016", 18 pgs.

"European Application Serial No. 15002058.4, Response filed Oct. 25, 2019 to Communication Pursuant to Article 94(3) EPC dated Jul. 2, 2019", 41 pgs.

"European Application Serial No. 15002058.4, Response filed Nov. 3, 2017 to Communication Pursuant to Article 94(3) EPC dated Jun. 26, 2017", 18 pgs.

"European Application Serial No. 15002415.6, Communication Pursuant to Article 94(3) EPC dated Jul. 2, 2019", 14 pgs.

"European Application Serial No. 15002415.6, Communication Pursuant to Article 94(3) EPC dated Aug. 9, 2017", 6 pgs.

"European Application Serial No. 15002415.6, Communication Pursuant to Article 94(3) EPC dated Dec. 13, 2019", 6 pgs.

"European Application Serial No. 15002415.6, Extended European Search Report dated Mar. 3, 2016", 8 pgs.

"European Application Serial No. 15002415.6, Response filed Apr. 14, 2020 to Communication Pursuant to Article 94(3) EPC dated Dec. 13, 2019", 16 pgs.

"European Application Serial No. 15002415.6, Response filed Aug. 18, 2016 to Extended European Search Report dated Mar. 3, 2016", 21 pgs.

"European Application Serial No. 15002415.6, Response filed Oct. 25, 2019 to Communication Pursuant to Article 94(3) EPC dated Jul. 2, 2019", 19 pgs.

"European Application Serial No. 15002415.6, Response filed Dec. 5, 2017 to Communication Pursuant to Article 94(3) EPC dated Aug. 9, 2017", 14 pgs.

"Taiwanese Application Serial No. 104125360, Office Action dated Sep. 9, 2016", 8 pgs.

(56) References Cited

OTHER PUBLICATIONS

Park, Jinseok, et al., "10MHz Current Mode 4 Switch Buck Boost Converter (4SBBC) for Polar Modulation", IEEE, (2008), 1977-1983.

"International Application Serial No. PCT/US2021/047903, International Search Report dated Dec. 23, 2021", 4 pgs.

"International Application Serial No. PCT/US2021/047903, Written Opinion dated Dec. 23, 2021", 5 pgs.

* cited by examiner

PEAK-BUCK PEAK-BOOST CURRENT-MODE CONTROL FOR SWITCHED STEP-UP STEP-DOWN REGULATORS

CROSS REFERENCE TO RELATED APPLICATIONS

The present application is related to and claims priority of U.S. provisional patent application ("Provisional Application I"), Ser. No. 62/088,433, entitled "Peak-Buck Peak-Boost Current-Mode Control for Switched Step-up Step-down Regulators," filed on Dec. 5, 2014. The disclosure of Provisional Application I is hereby incorporated by reference in its entirety.

The present application is also related to U.S. provisional patent application ("Provisional Application II"), Ser. No. 62/054,587, entitled "DCR inductor current sensing for 4 switch buck-boost converters," filed on Sep. 24, 2014. The disclosure of the Provisional Application II is hereby incorporated by reference in its entirety.

BACKGROUND OF THE INVENTION

1. Field of the Invention

The present invention relates to switched step-up step-down regulators, and more particularly, to the control of such switched step-up step-down regulators using a current-mode control scheme.

2. Discussion of the Related Art

Step up-step down or buck-boost switching regulators handle input voltages that can be above, below, or equal to the output voltage. FIGS. 1 and 2 are schematic diagrams which show a synchronous four-switch buck-boost regulator and a non-synchronous two-switch buck-boost regulator, respectively. In each of the buck-boost regulators of FIGS. 1 and 2, the output voltage is regulated by sequentially activating or deactivating switches $S_A$, $S_B$, $S_C$ and $S_D$. For example, three types of control schemes may be applied to these buck-boost regulators: (a) a hysteretic mode control scheme, disclosed in U.S. Pat. No. 6,348,779 ("Sluijs"); (b) a voltage mode control scheme, disclosed in U.S. Pat. No. 6,087,816 ("Volk"), U.S. Pat. No. 6,166,527 ("Dwelley") and U.S. Pat. No. 7,116,085 ("Ikezawa"); and (c) a current mode control scheme, disclosed in U.S. Pat. No. 7,256,570 ("Zhou"), U.S. Pat. No. 7,298,119 ("Amram Summit"), U.S. Pat. No. 7,394,231 ("Flatness"), and U.S. Patent Application Publication 2011/0279098 ("Ren").

Hysteretic mode control schemes, e.g., those disclosed in Sluijs, typically switch among different operating states based on monitoring an output voltage using a window comparator. Disadvantages of a hysteretic mode control scheme include: the varying switching frequency is load-dependent, high output voltage ripples, and high noise mode transition.

Voltage mode control schemes, e.g., those disclosed in Volk, Dwelley and Ikezawa, are widely used in commercial buck-boost regulators. Voltage mode control schemes offer fixed switching frequency, low output voltage ripples, and low noise mode transition. However, the voltage mode control schemes typically run in forced continuous conduction mode, in which the inductor current can flow from the output terminal to the input terminal. The forced continuous conduction mode operation is not suitable for some applications (e.g., a battery charger application) that do not allow reverse currents. For such applications, a pulse-skip or burst discontinuous conduction mode operation handles the reverse current, when present. However, mode transitions in these control schemes generate large output transient ripples in the output load. Other disadvantages of the voltage mode control schemes include difficulty in compensating for a wide $V_{IN}$ range and no paralleling output capability.

The current mode control schemes, e.g., those disclosed in Zhou, Amram Summit, Flatness and Ren, allow easy compensation and parallel outputs. FIG. 3 illustrates a conventional peak current mode control scheme as applied to a synchronous four-switch buck-boost regulator (e.g., the synchronous four-switch buck-boost regulator of FIG. 1). In the peak current mode scheme of FIG. 3, switches $S_A$ and $S_C$ are activated at the beginning of every clock pulse, allowing the inductor current of inductor L to be sensed by a comparator receiving a voltage across resistor $R_S$. When the comparator output voltage switches polarity, switches $S_A$ and $S_C$ are deactivated and switches $S_B$ and $S_D$ are activated until the next clock pulse. This peak current mode scheme does not have a mode transition. However, the disadvantages of the current mode control scheme include high inductor current ripples and low power efficiency.

FIG. 4 illustrates another current mode control scheme—the valley-buck peak-boost current mode scheme. The valley-buck peak-boost control scheme achieves low inductor current ripples, low output voltage ripples, and high power efficiency. Under the valley-buck peaK-boost control scheme, based on the inductor current sensed in ground sensing $R_S$ resistor, the regulator runs in a valley current mode control scheme for a step-down operation and a peak current mode control scheme for a step-up operation. The valley-buck peak-boost control scheme is advantageous for operating in a continuous conduction mode because of its symmetry. However, without a reverse current detection capability under boost operations (when switches $S_A$ and $S_D$ are activated), the pulse-skip or burst mode discontinuous conduction operations are problematic. In addition, the valley current mode control scheme during step-down operations may present a current-runaway condition, as no peak current limit is enforced.

SUMMARY

According to one embodiment of the present invention, a peak-buck peak-boost current mode control scheme is applied to a synchronous four-switch buck-boost regulator or a non-synchronous two-switch buck-boost regulator. Such a peak-buck peak-boost current mode control scheme, which uses a single inductor sensing resistor to detect the inductor current, is capable of handling a reverse current, while achieving the benefits of low inductor current ripples, low output voltage ripples, and high power efficiency.

The control scheme of the present invention is applicable to both continuous conduction and discontinuous conduction operations, including pulse skip discontinuous conduction mode and burst mode discontinuous conduction mode operations. The peak-buck peak-boost current mode control scheme of the present invention may be applied to synchronous two-switch buck regulators, synchronous two-switch boost regulators, non-synchronous single-switch buck regulators and non-synchronous single-switch boost regulators.

According to one embodiment of the present invention, a peak-buck peak-boost control circuit for a voltage regulator may include (i) a mode selection circuit generating control signals representing (a) a first control state in which the input voltage is greater than the output voltage by at least a predetermined value; (b) a second control state in which the input voltage is greater than the output voltage less than or equal to the predetermined value; (c) a third control state in which the output voltage is greater than the input voltage by less than or equal to a second predetermined value; (d) a fourth control state in which the output voltage is greater than the input voltage by at least the predetermined value; and (ii) switch control signal generation circuit for generating control signals for operating switches in the voltage regulator, such that the voltage regulator is configured as (a) the buck regulator in the first control state, (b) a buck-boost regulator in the second and third control states, and (c) a boost regulator in the fourth control state.

The mode selection circuit may incorporate hysteresis for transitioning between the first and second control states, or for transitioning between the third and fourth control states. The output voltage may be provided as a scaled feedback signal. The voltage regulator may include an inductor and the peak-buck and peak-boost control scheme may use a ramping voltage signal to determine a peak value in a current flowing in the inductor. The peak value may be determined from the ramping voltage and an error signal derived from the output voltage. The occurrence of the peak value may be used to control switches in an output side of the voltage regulator. The error signal may be an amplified difference between a reference voltage and the output voltage. A compensation circuit receiving the error signal may be provided for ensuring loop stability in the voltage regulator.

The peak-buck peak-boost control scheme of the present invention may also determine an occurrence of the peak current using the ramping voltage, an offset voltage and an error signal derived from the output voltage. The offset voltage may be derived from a difference in voltage at two time points of the ramping voltage. The two time points are specific time points within a switching cycle of the peak-buck peak-boost control circuit. The occurrence of the peak value may be used to control switches in an input side of the voltage regulator.

The current mode control scheme of the present invention may also be used in conjunction with any inductor current-sensing method disclosed in Copending provisional Application II.

The present invention is better understood upon consideration of the detailed description below in conjunction with the accompanying drawings.

according to one embodiment of the present invention.

Figure 9:
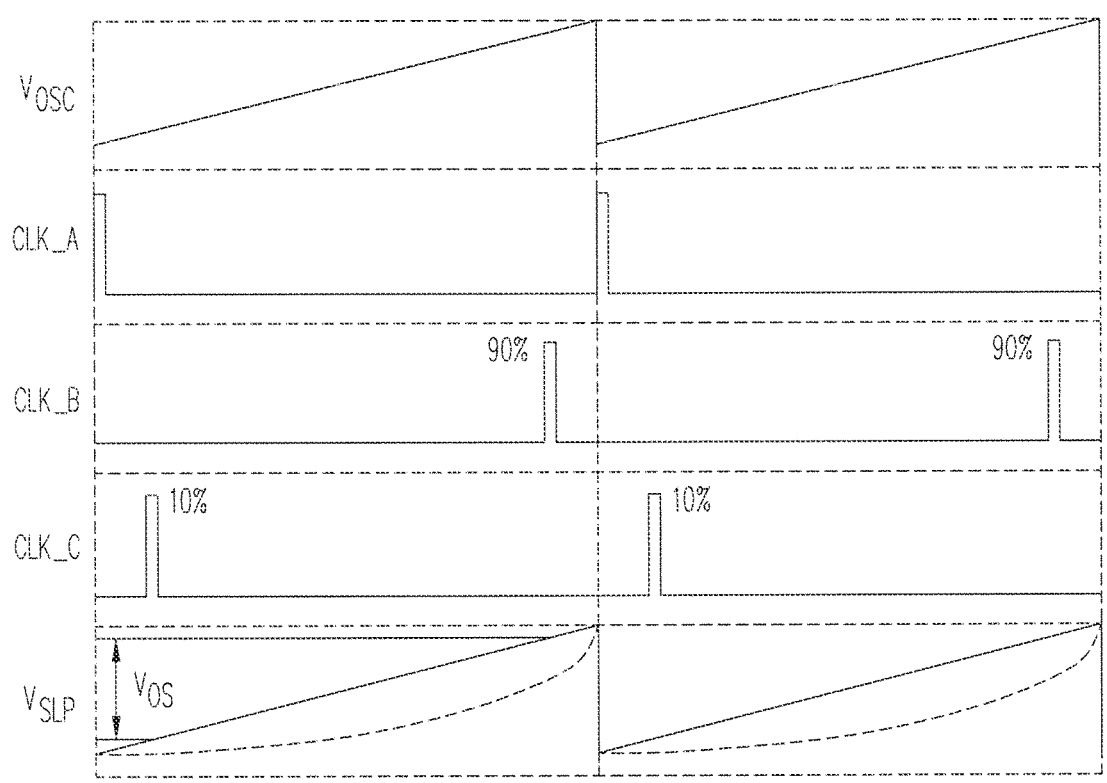

FIG. 9 shows waveforms of clock signals, CLK_A, CLK_B, and CLK_C, slope compensation signal $V_{SLP}$ and slope compensation offset signal $V_{OS}$, according to one embodiment of the present invention.

Figure 7:
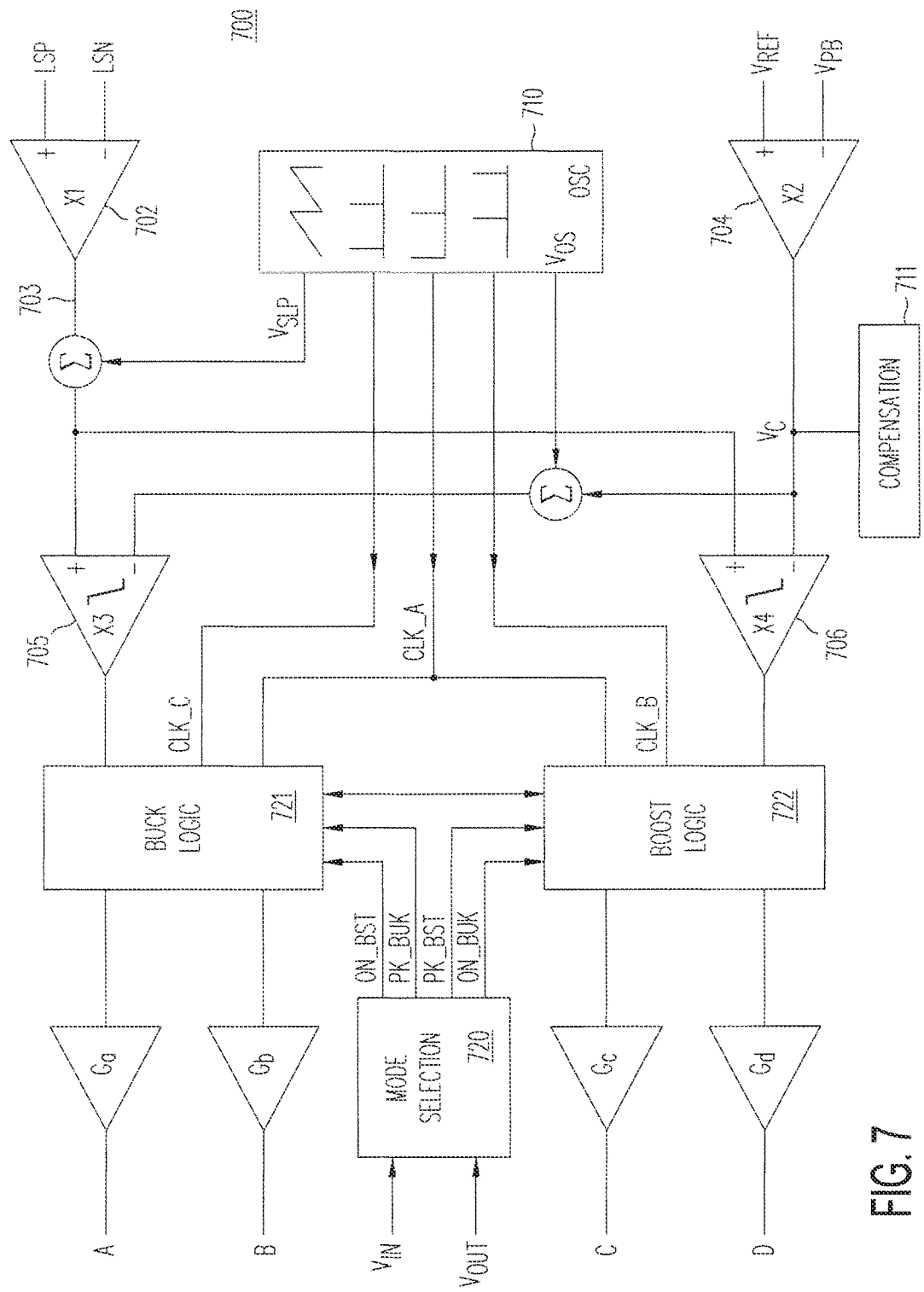
FIG. 7 is a block diagram showing schematically control circuit 700, which implements a peak-buck peak-boost current mode control scheme, in accordance with one embodiment of the present invention.
Figure 10:
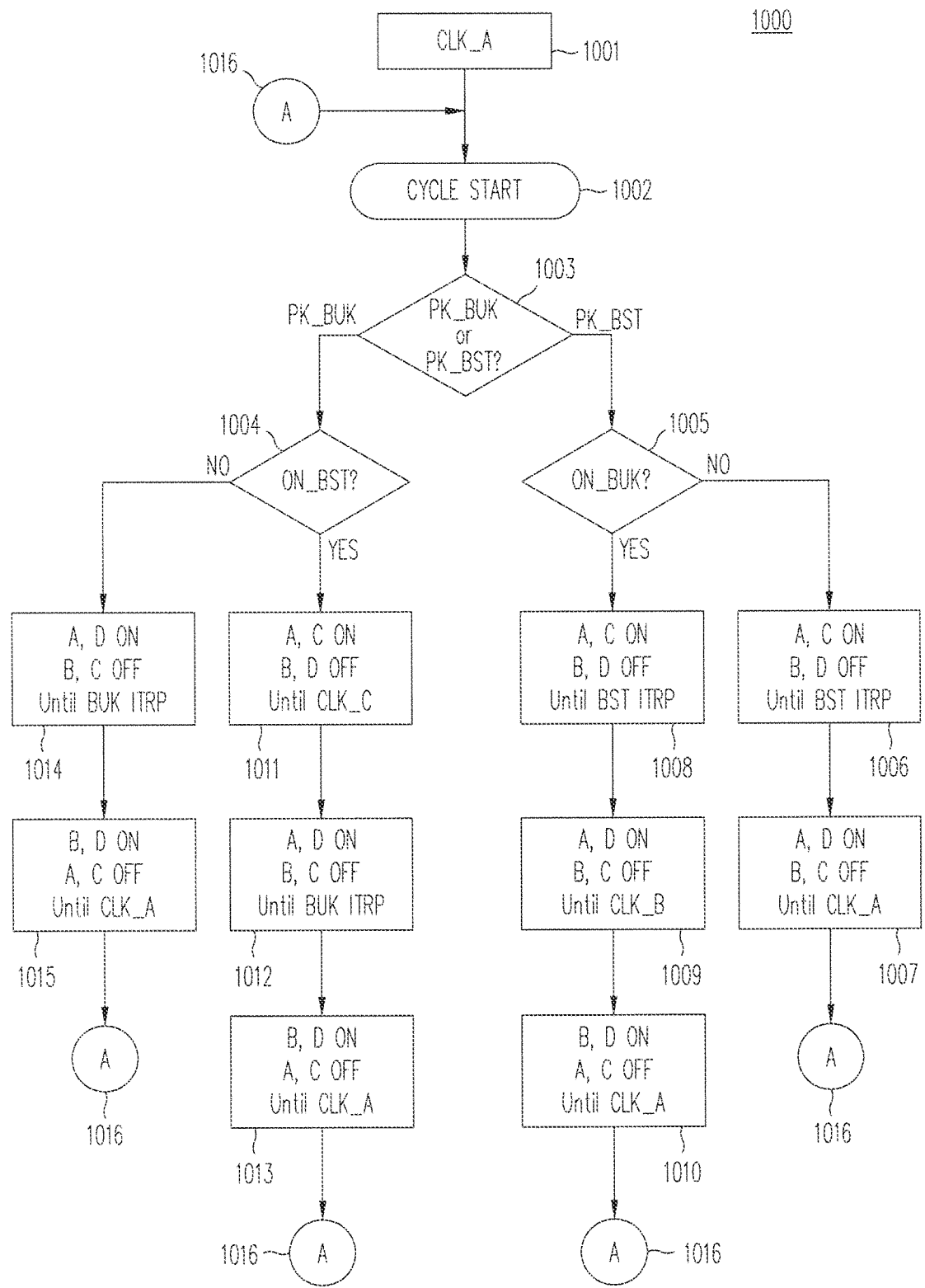

FIG. 10 shows flow chart 1000 illustrating the operations of buck logic circuit 721 and boost logic circuit 722 of FIG. 7 under a continuous conduction mode, in accordance with one embodiment of the present invention.

Figure 11:
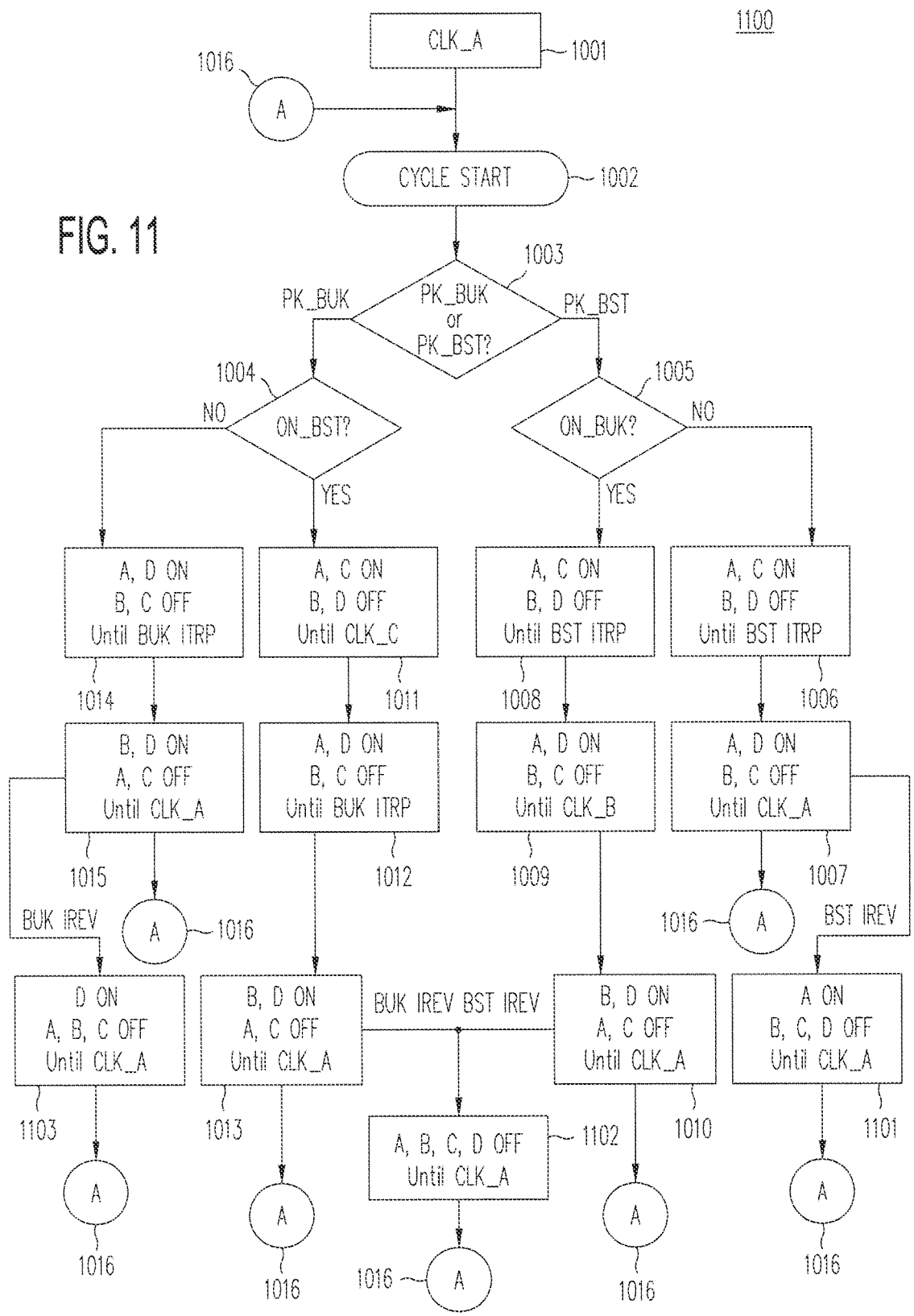

FIG. 11 shows flow chart 1100 illustrating the operations of buck logic circuit 721 and boost logic circuit 722 of FIG. 7 under a discontinuous conduction mode, in accordance with one embodiment of the present invention.

Figure 12:
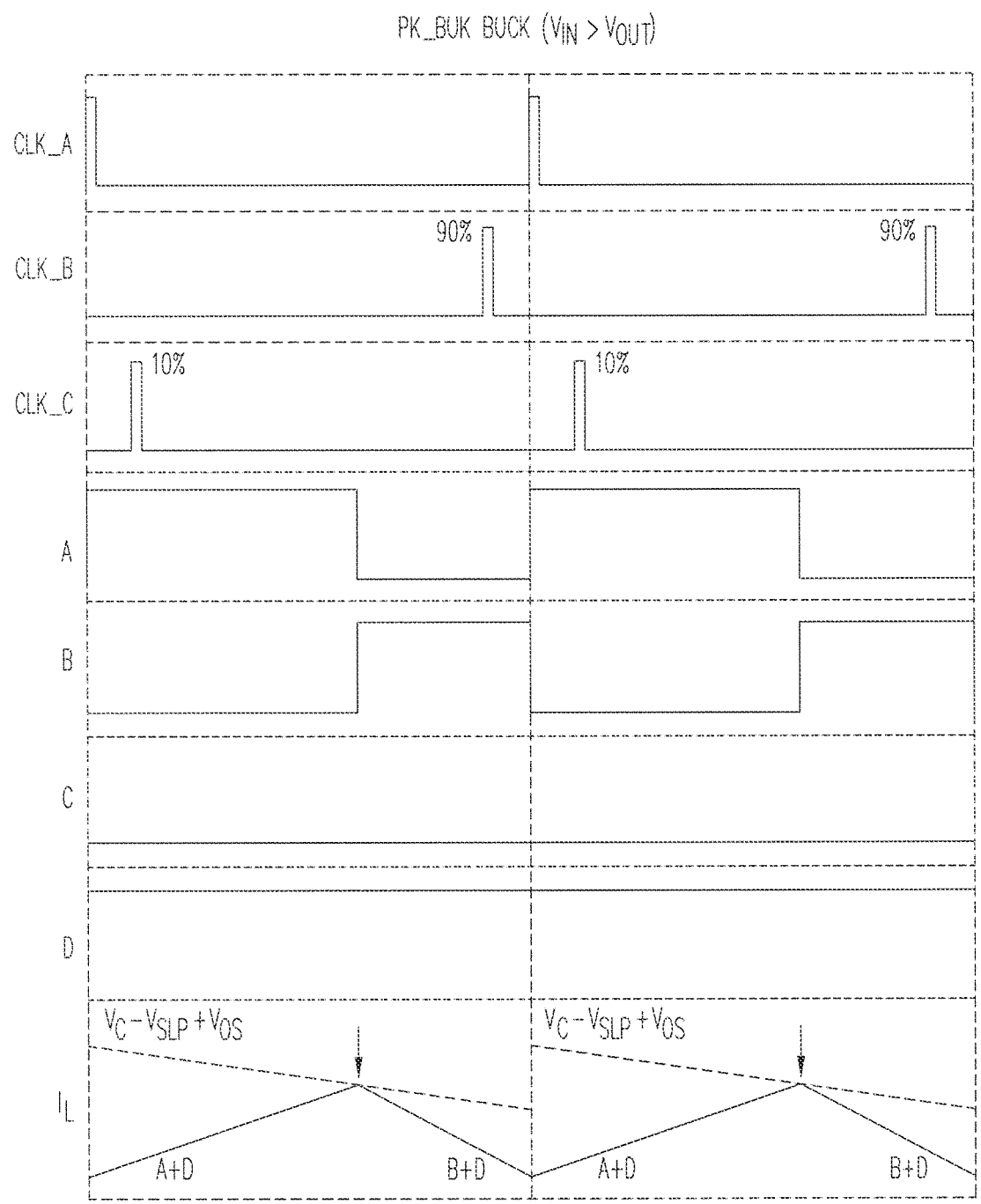

FIG. 12 shows the waveforms of control signals CLK_A, CLK_B, CLK_C, A, B, C and D and current $I_L$ in inductor L, under the operating condition in which input voltage $V_{IN}$ is much higher than output voltage $V_{OUT}$, in accordance one embodiment of the present invention.

Figure 13:
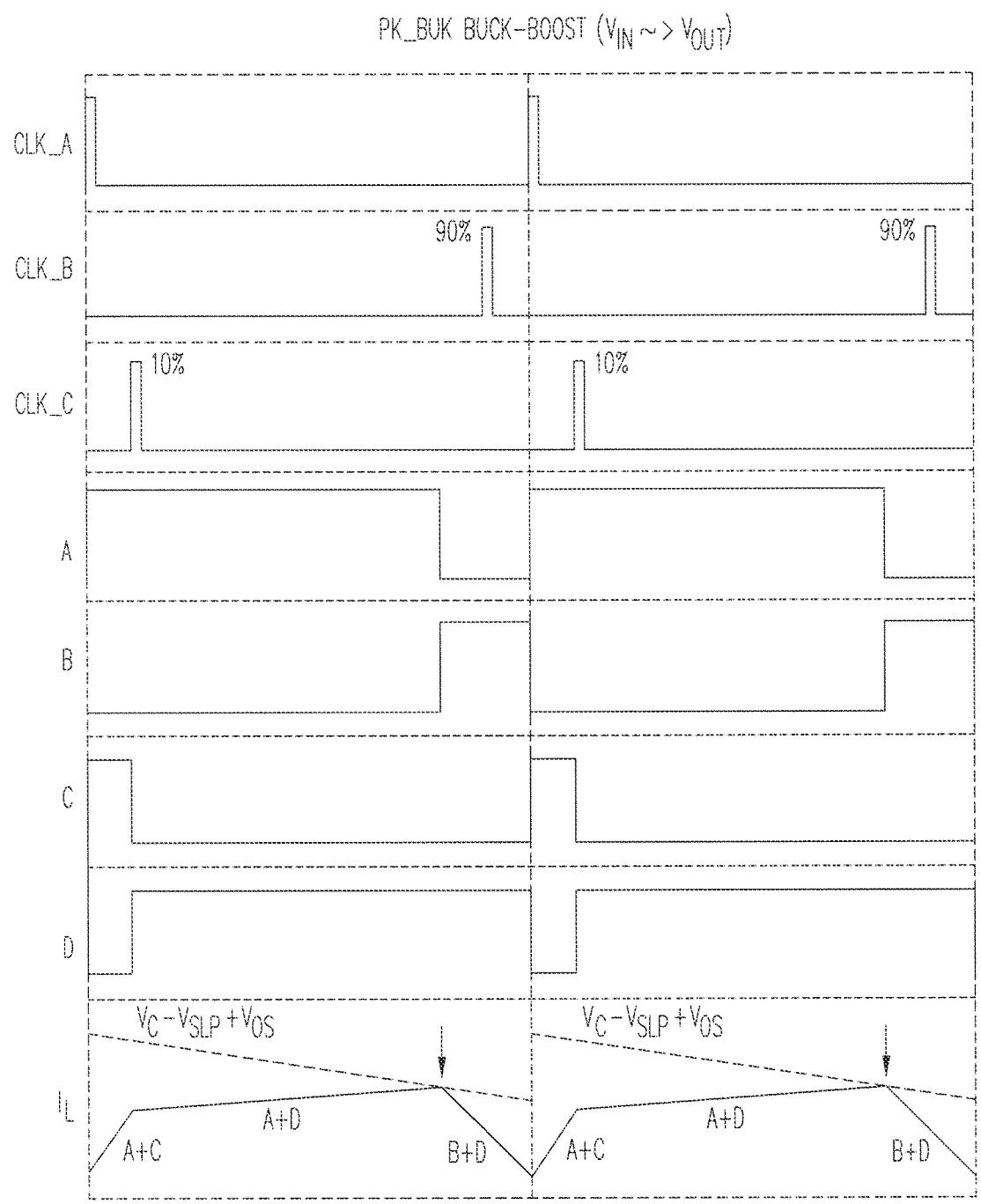

FIG. 13 shows the waveforms of control signals CLK_A, CLK_B, CLK_C, A, B, C and D and current $I_L$ in inductor L, under the operating condition in which input voltage $V_{IN}$ is slightly higher than output voltage $V_{OUT}$, in accordance one embodiment of the present invention.

Figure 14:
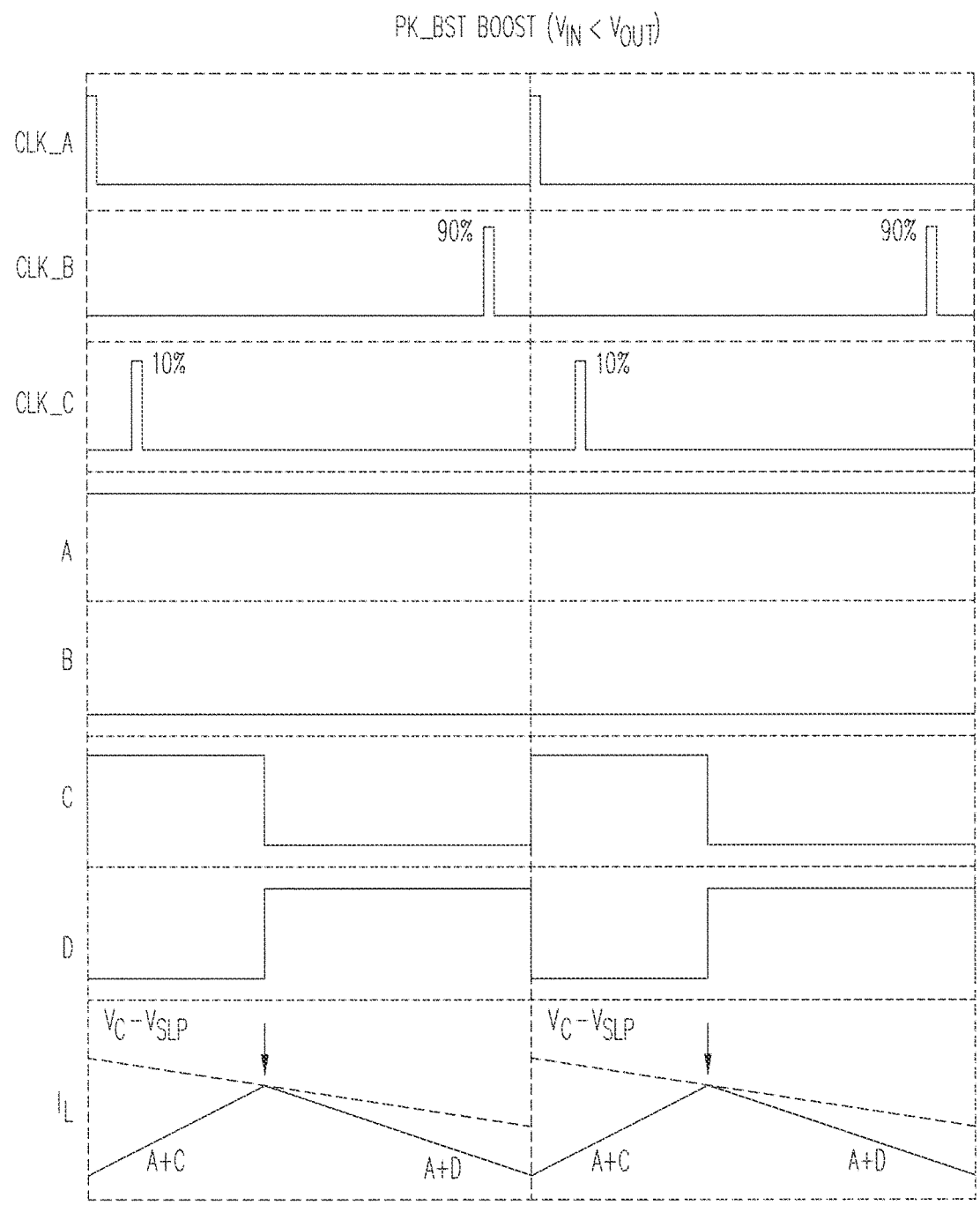

FIG. 14 shows the waveforms of control signals CLK_A, CLK_B, CLK_C, A, B, C and D and current $I_L$ in inductor L, under the operating condition in which input voltage $V_{IN}$ is much lower than output voltage $V_{OUT}$, in accordance one embodiment of the present invention.

Figure 15:
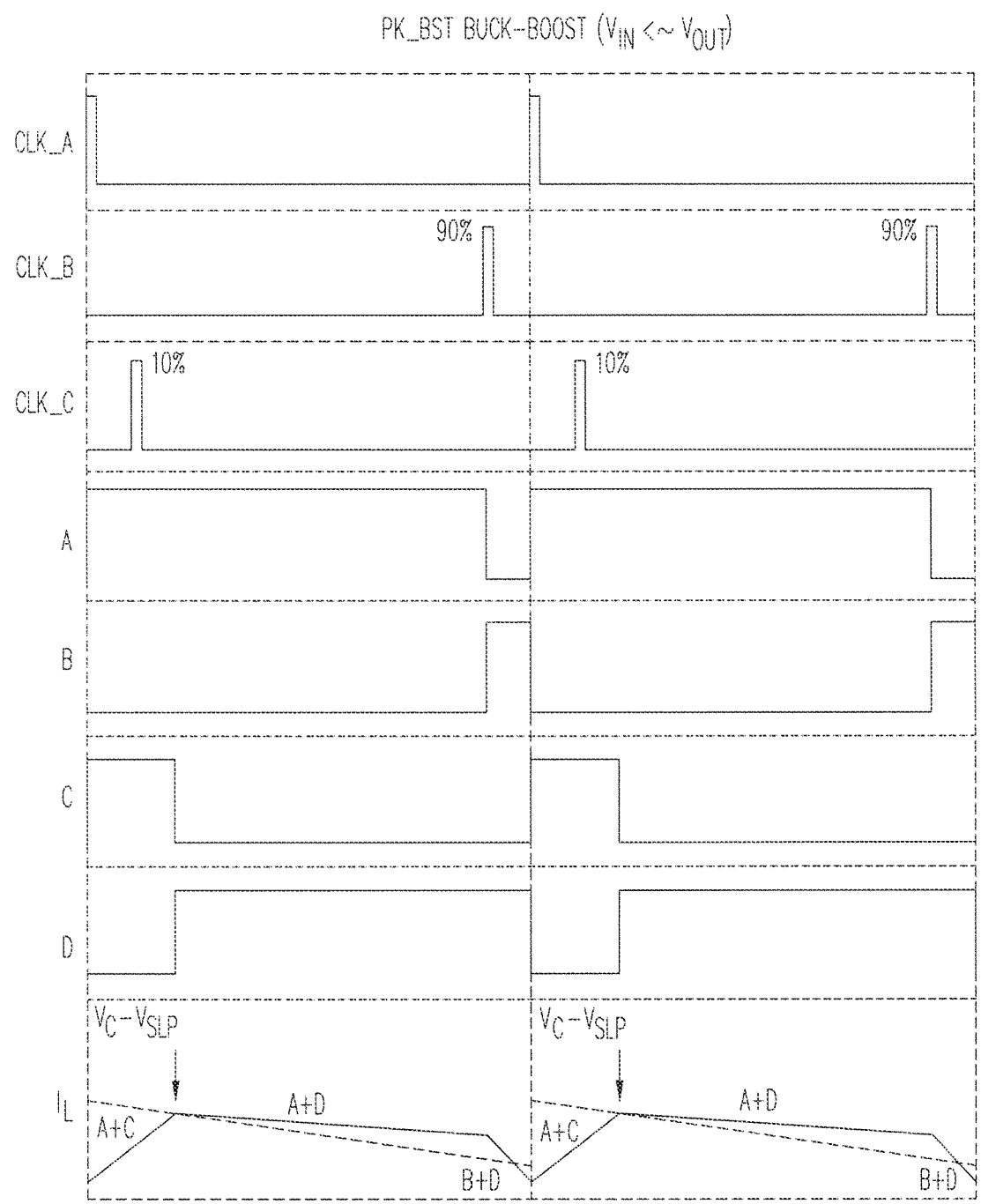

FIG. 15 shows the waveforms of control signals CLK_A, CLK_B, CLK_C, A, B, C and D and current h, in inductor L, under the operating condition in which input voltage $V_{IN}$ is slightly lower than output voltage $V_{OUT}$, in accordance one embodiment of the present invention.

Figure 16:
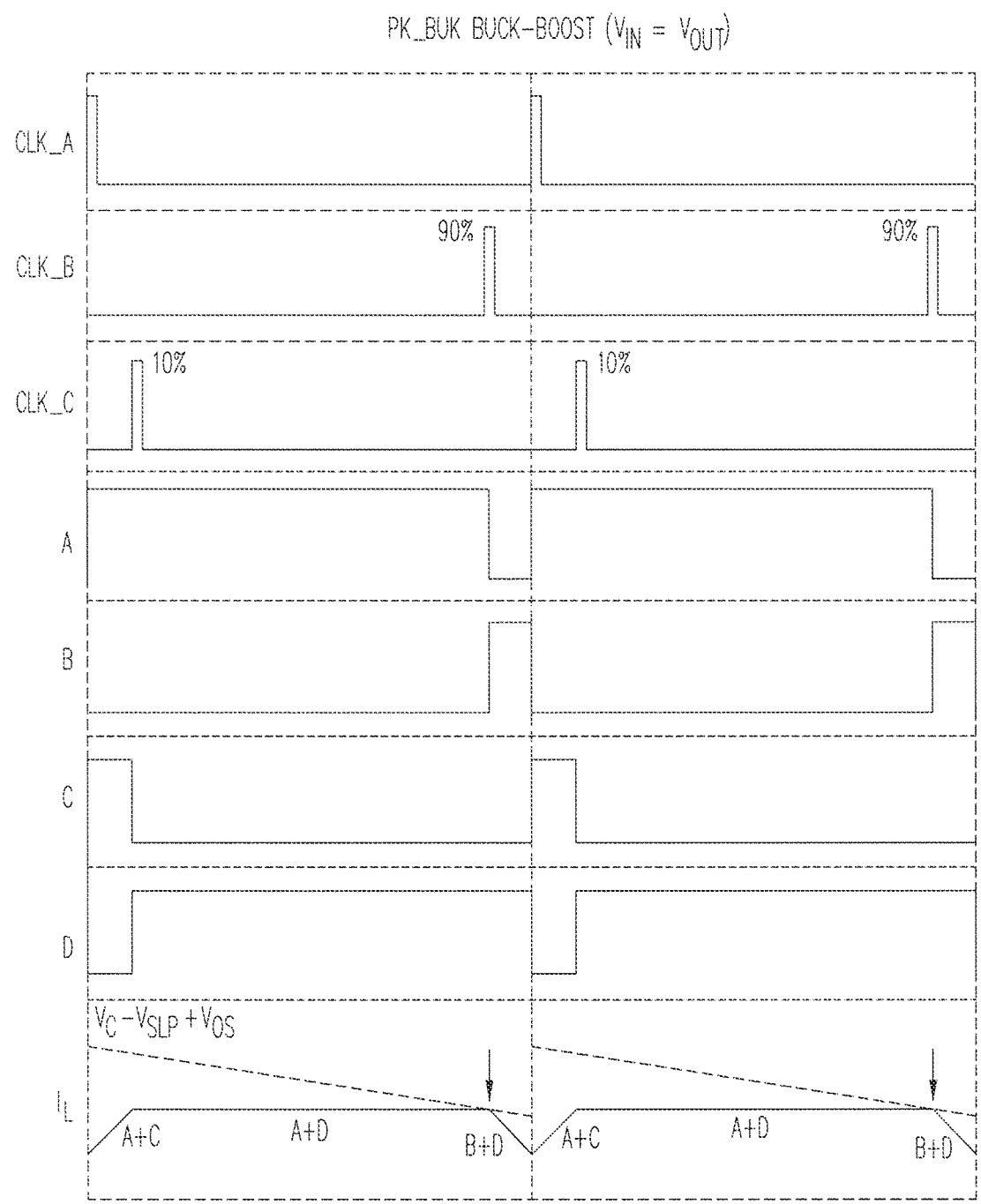

FIG. 16 shows the waveforms of control signals CLK_A, CLK_B, CLK_C, A, B, C and D and current $I_L$ in inductor L, under the operating condition in which input voltage $V_{IN}$ is equal output voltage $V_{OUT}$ in peak-buck buck-boost mode, in accordance one embodiment of the present invention.

Figure 17:
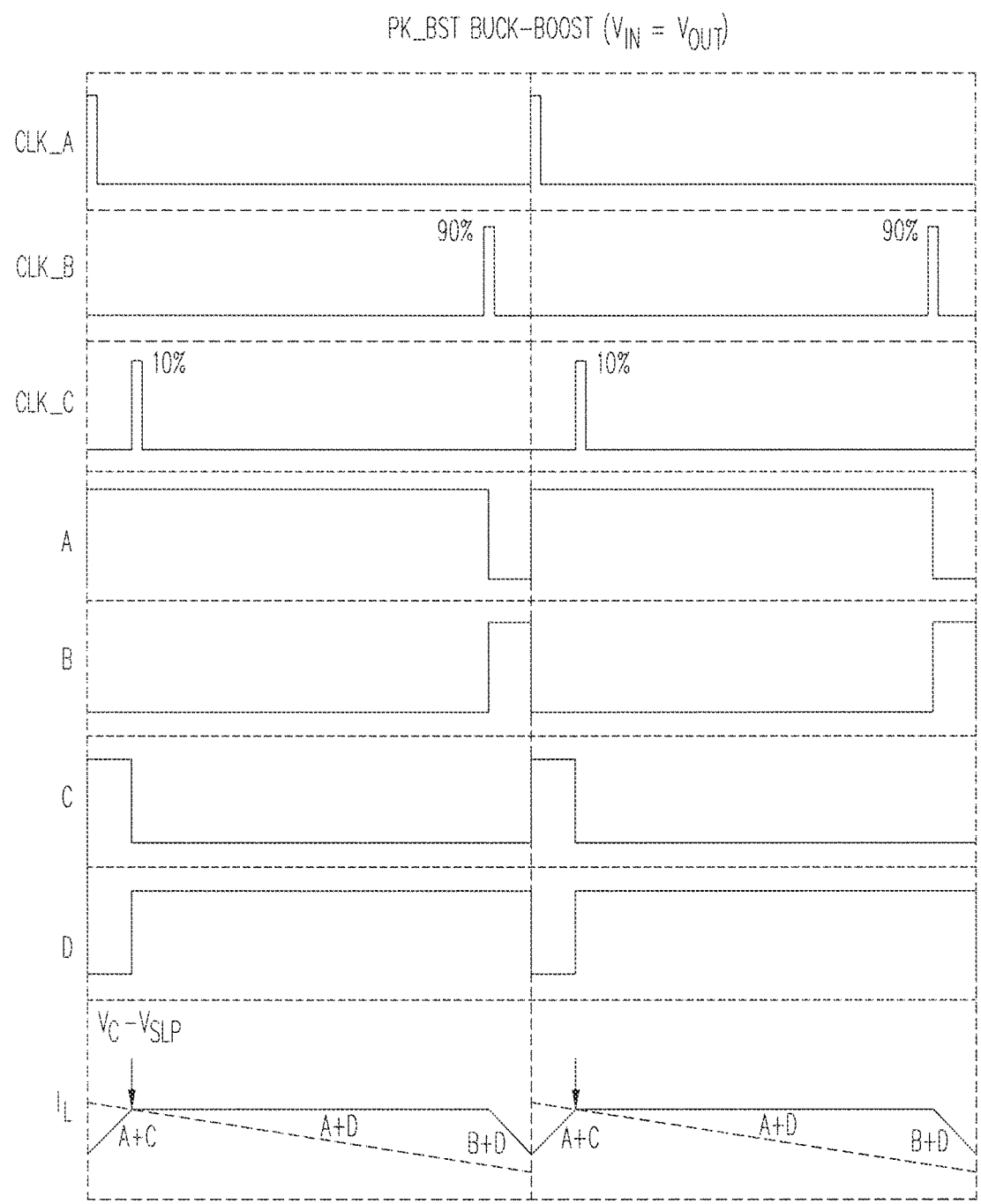

FIG. 17 shows the waveforms of control signals CLK_A, CLK_B, CLK_C, A, B, C and D and current $I_L$ in inductor L, under the operating condition in which input voltage $V_{IN}$ is equal output voltage $V_{OUT}$ in peak-boost buck-boost mode, in accordance one embodiment of the present invention.

To facilitate cross-referencing among the figures, like elements are assigned like reference numerals.

DETAILED DESCRIPTION OF THE PREFERRED EMBODIMENTS

Figure 1:
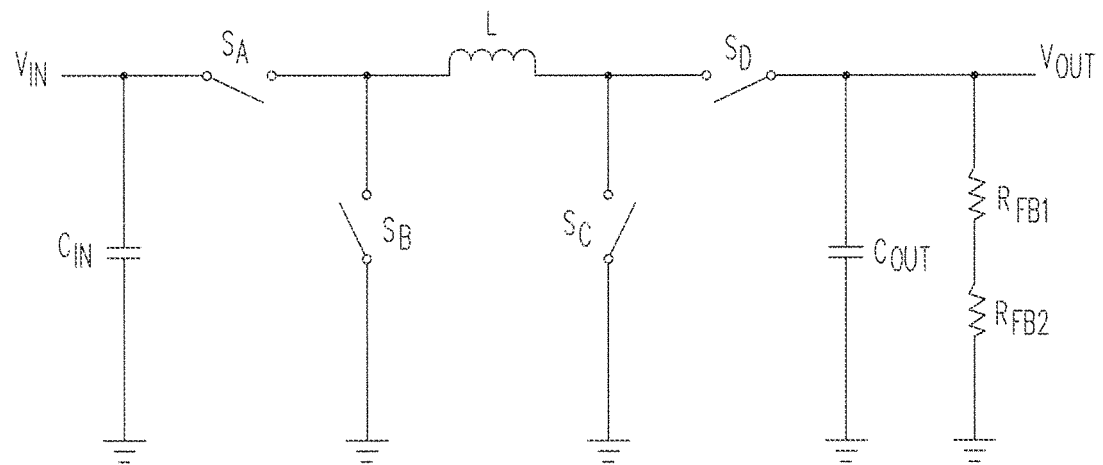
FIG. 1 is a schematic diagram which shows a synchronous four-switch buck-boost regulator.
Figure 2:
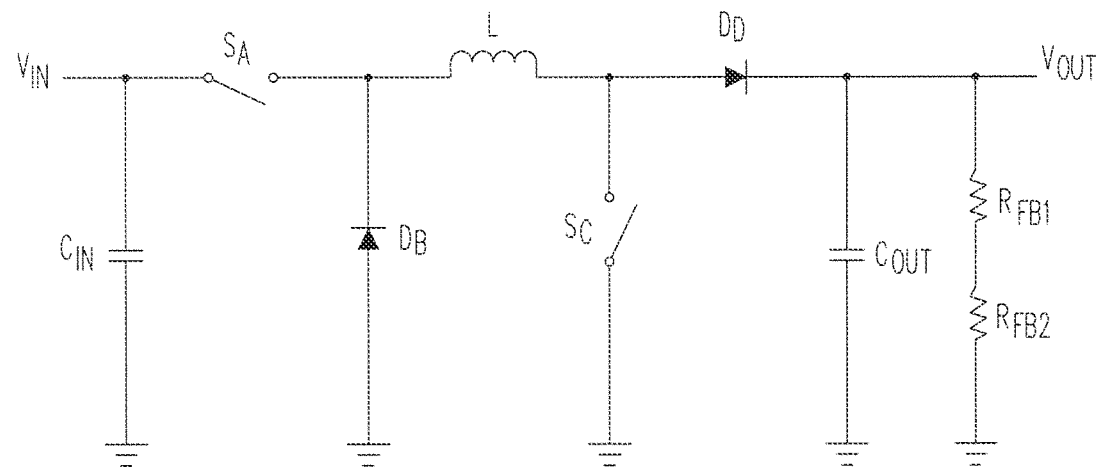
FIG. 2 is a schematic diagram which shows a non-synchronous two-switch buck-boost regulator.
Figure 3:
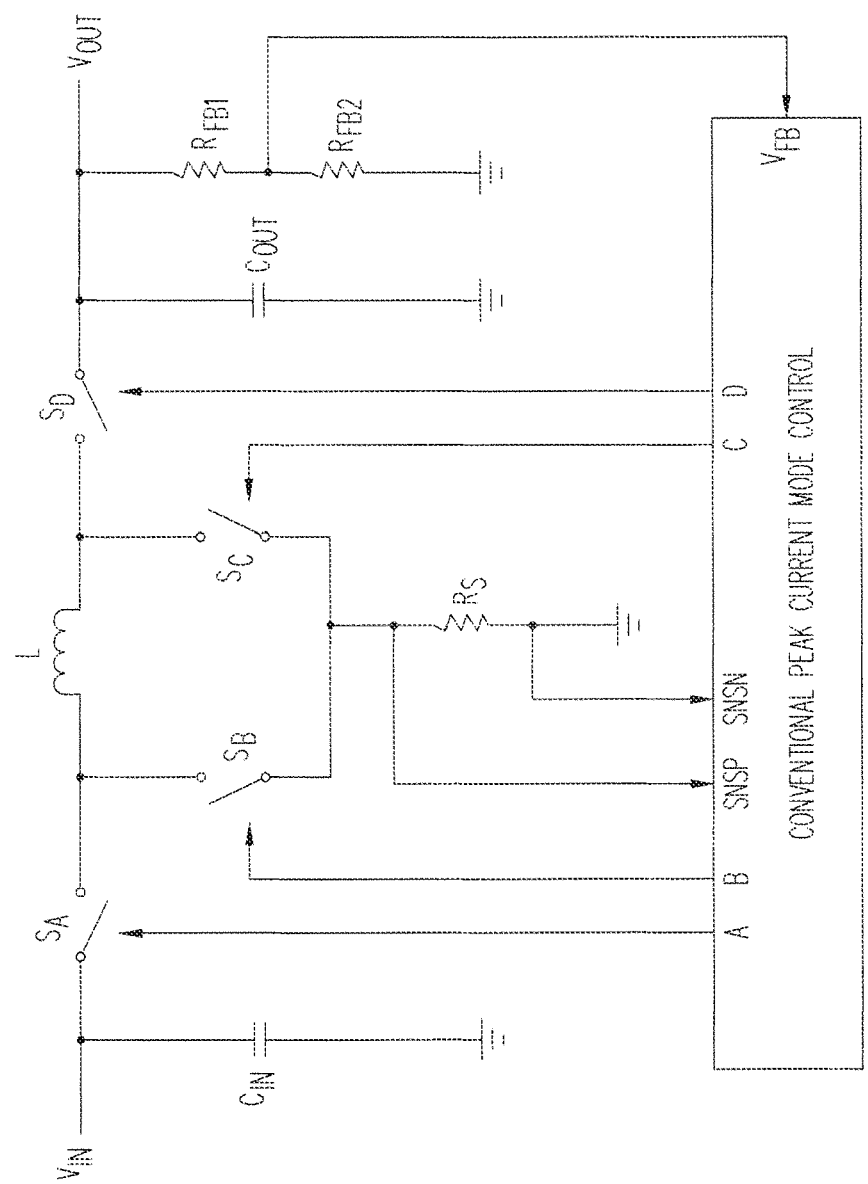
FIG. 3 illustrates a conventional peak current mode control scheme as applied to a synchronous four-switch buck-boost regulator (e.g., the synchronous four-switch buck-boost regulator of FIG. 1).
Figure 4:
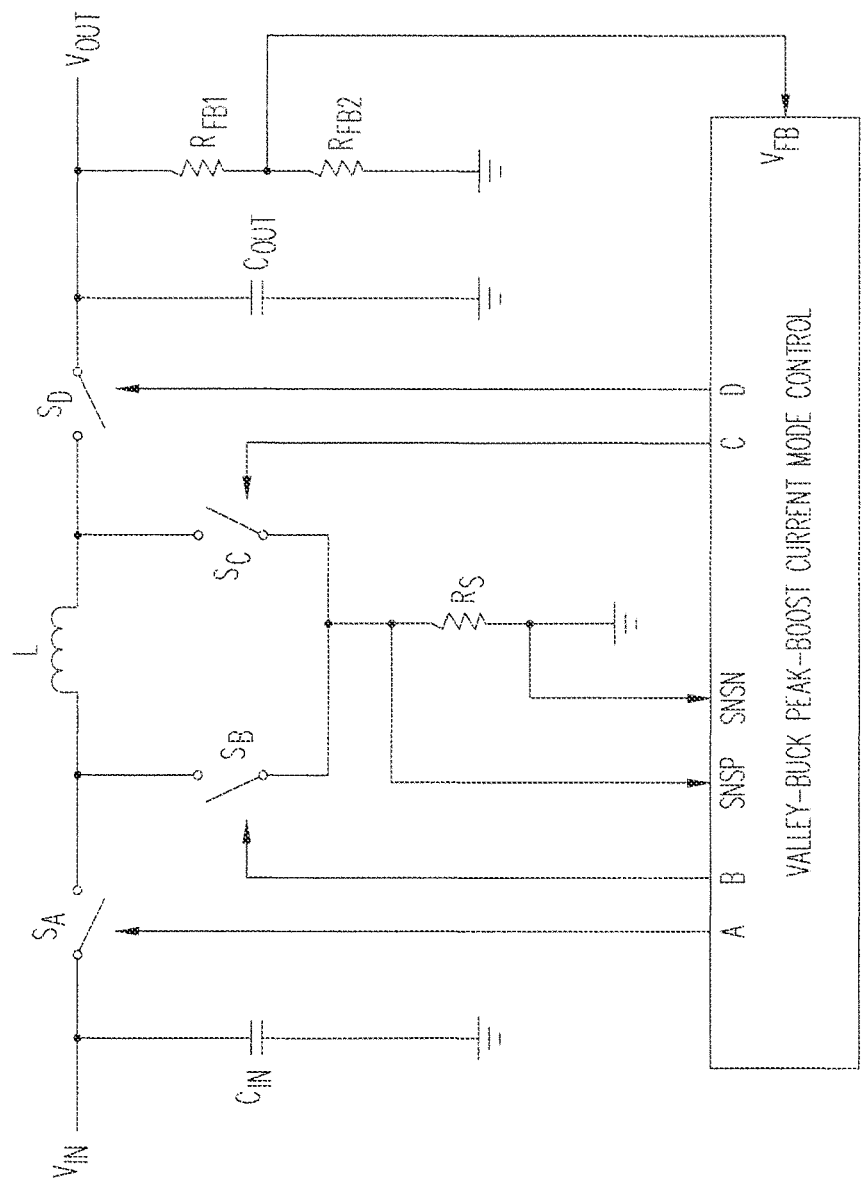
FIG. 4 illustrates a valley-buck peak-boost current mode control scheme as applied to a synchronous four-switch buck-boost regulator (e.g., the synchronous four-switch buck-boost regulator of FIG. 1).
Figure 5:
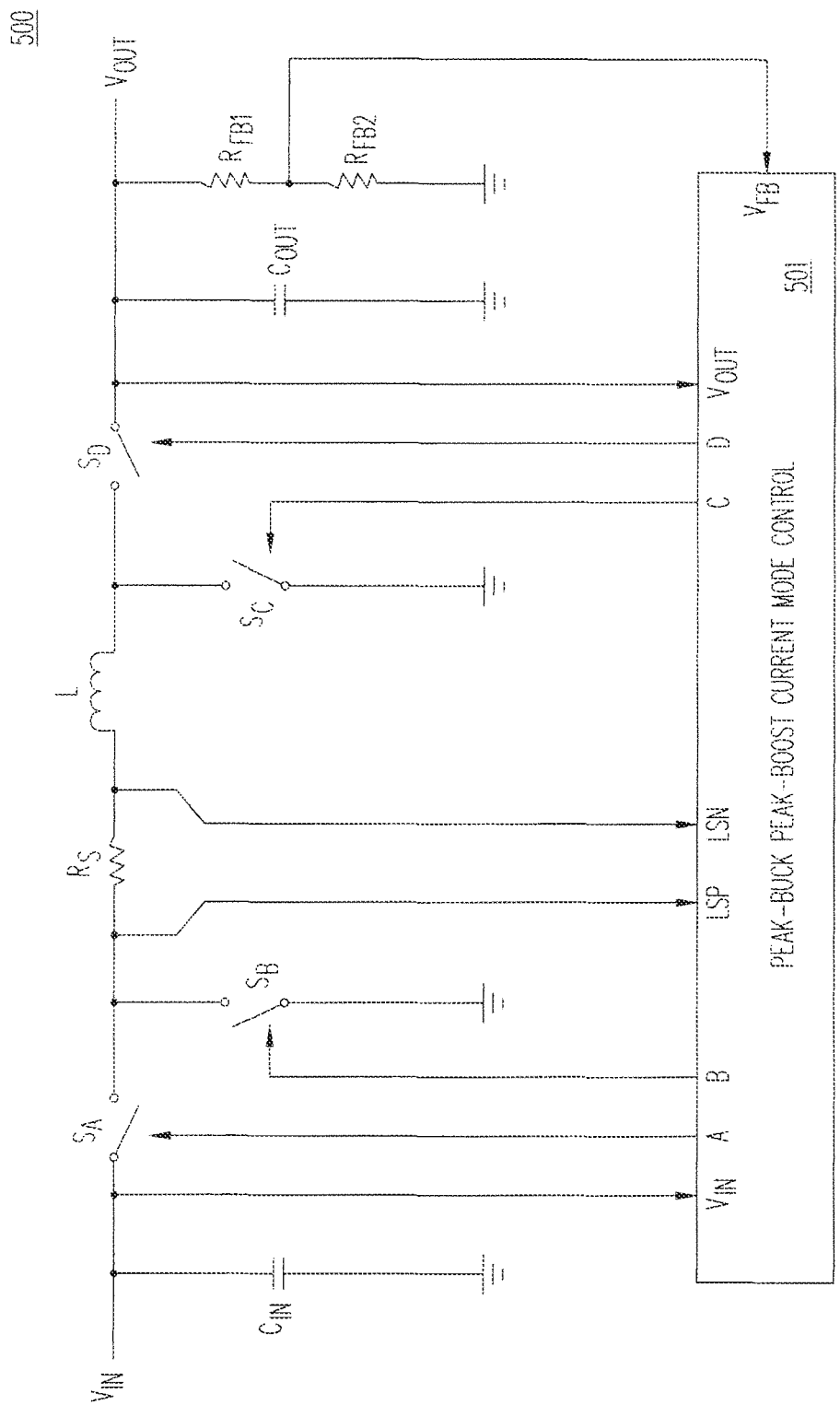
FIG. 5 shows synchronous four-switch buck-boost regulator 500 being controlled under a peak-buck peak-boost current mode control scheme, according to one embodiment of the present invention.
Figure 6:
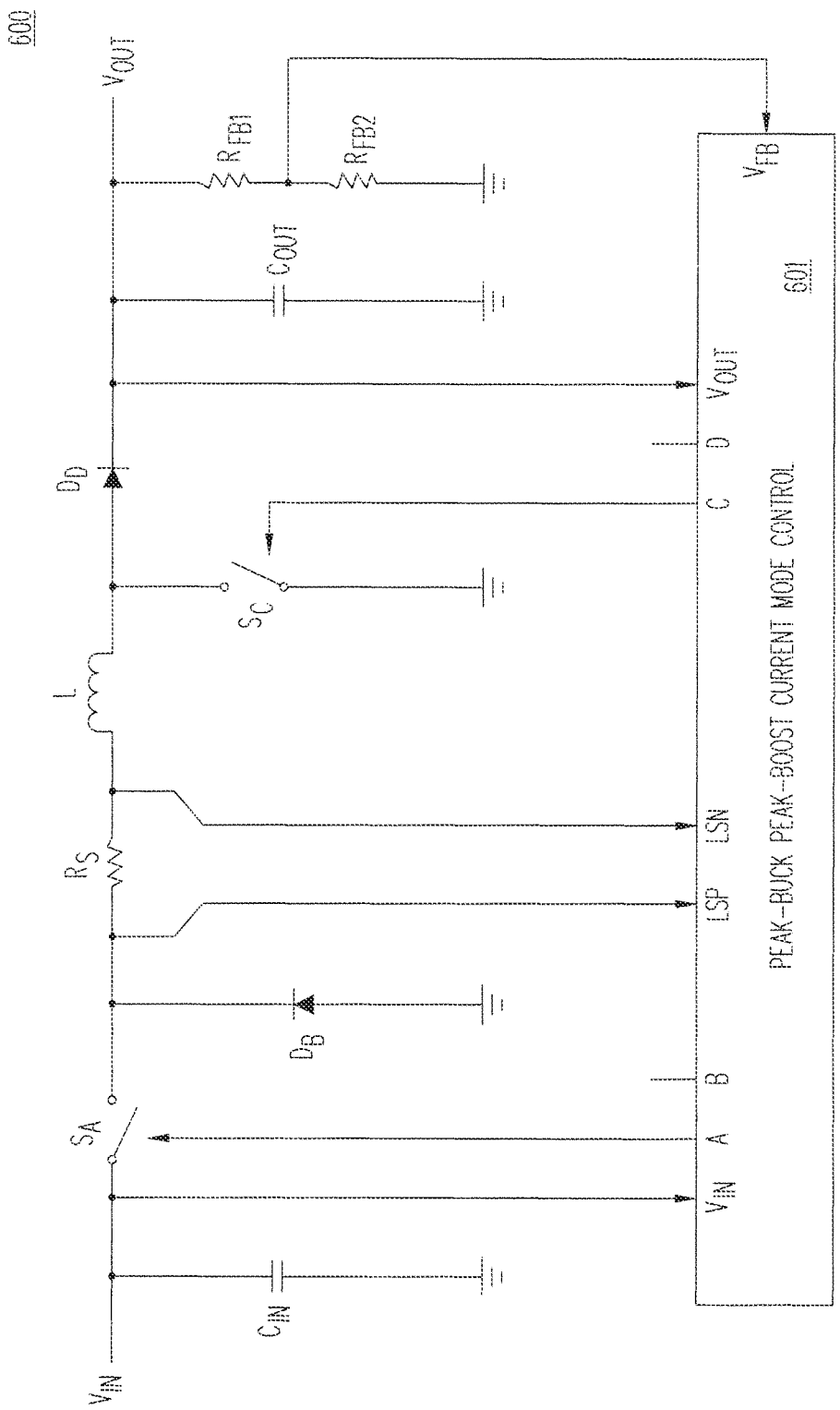
FIG. 6 shows non-synchronous two-switch buck-boost regulator 600 being controlled under a peak-buck peak-boost current mode control scheme, according to one embodiment of the present invention.

FIGS. 5 and 6 show control circuits 501 and 601 controlling synchronous four-switch buck-boost regulator 500 and non-synchronous two-switch buck-boost regulator 600, respectively, under a peak-buck peak-boost current mode control scheme, according to one embodiment of the present invention. As shown in FIGS. 5 and 6, control circuits 501 and 601 each receive its respective input voltage $V_{IN}$ and its respective output voltage $V_{OUT}$. Although FIGS. 5 and 6 each show direct sensing of voltages $V_{IN}$ and $V_{OUT}$, other methods may also be used, such as indirect sensing of $V_{IN}$ and $V_{OUT}$ and sensing scaled versions of $V_{IN}$ and $V_{OUT}$. Further, FIGS. 5 and 6 show buck-boost regulators 500 and 600 sensing the current in inductor L through sensing a voltage drop across single resistor $R_S$. However, other current sensing methods may also be used, such as direct-current resistance (DCR) sensing, FET drain-source ($V_{DS}$) sensing, or by the use of two resistors (i.e., one resistor provided between switch $S_A$ and the terminal receiving voltage $V_{IN}$, and the other resistor provided between switch $S_B$ and the ground reference.

FIG. 7 is a block diagram showing schematically control circuit 700, which implements a peak-buck peak-boost current mode control scheme, in accordance with one embodiment of the present invention. Control circuits 501 and 601 of FIGS. 5 and 6 may each be implemented by control circuit 700. Control circuit 700 provides output signals A, B, C and D for controlling switches $S_A$, $S_B$, $S_C$ and $S_D$ of a synchronous four-switch buck-boost regulator, respectively. In the case of controlling a non-synchronous two-switch buck-boost regulator, such as shown in FIG. 6, signals B and D may be simply ignored. As shown in FIG. 7, control circuit 700 receives input signals $V_{IN}$, $V_{OUT}$, LSP, LSN, and $V_{FB}$. Signals LSP and LSN provide the voltage drop across sensing resistor $R_S$ and signal $V_{FB}$ is a scaled voltage representing output voltage $V_{OUT}$.

Control circuit 700 operates a regulator under one of four operating modes: (a) when input voltage $V_{IN}$ is much higher than output voltage $V_{OUT}$; (b) when input voltage $V_{IN}$ is much lower than output voltage $V_{OUT}$; (c) when input voltage $V_{IN}$ is slightly higher than output voltage $V_{OUT}$, and (d) when input voltage $V_{IN}$ is slightly lower than output voltage $V_{OUT}$. When input voltage $V_{IN}$ is much higher than output voltage $V_{OUT}$, the regulator is operated under a pure buck mode with peak-buck current mode control ("peak-buck buck mode"). When input voltage $V_{IN}$ is much lower than output voltage $V_{OUT}$, the regulator is operated under a pure boost mode with peak-boost current mode control ("peak-boost boost mode"). When input voltage $V_{IN}$ is slightly higher than output voltage $V_{OUT}$, the regulator is operated under a buck-boost mode with peak-buck current mode control ("peak-buck buck-boost mode"). When input voltage $V_{IN}$ is slightly lower than output voltage $V_{OUT}$, the regulator is operated under a buck-boost mode with peak-boost current mode control ("peak-boost buck-boost mode").

Figure 8:
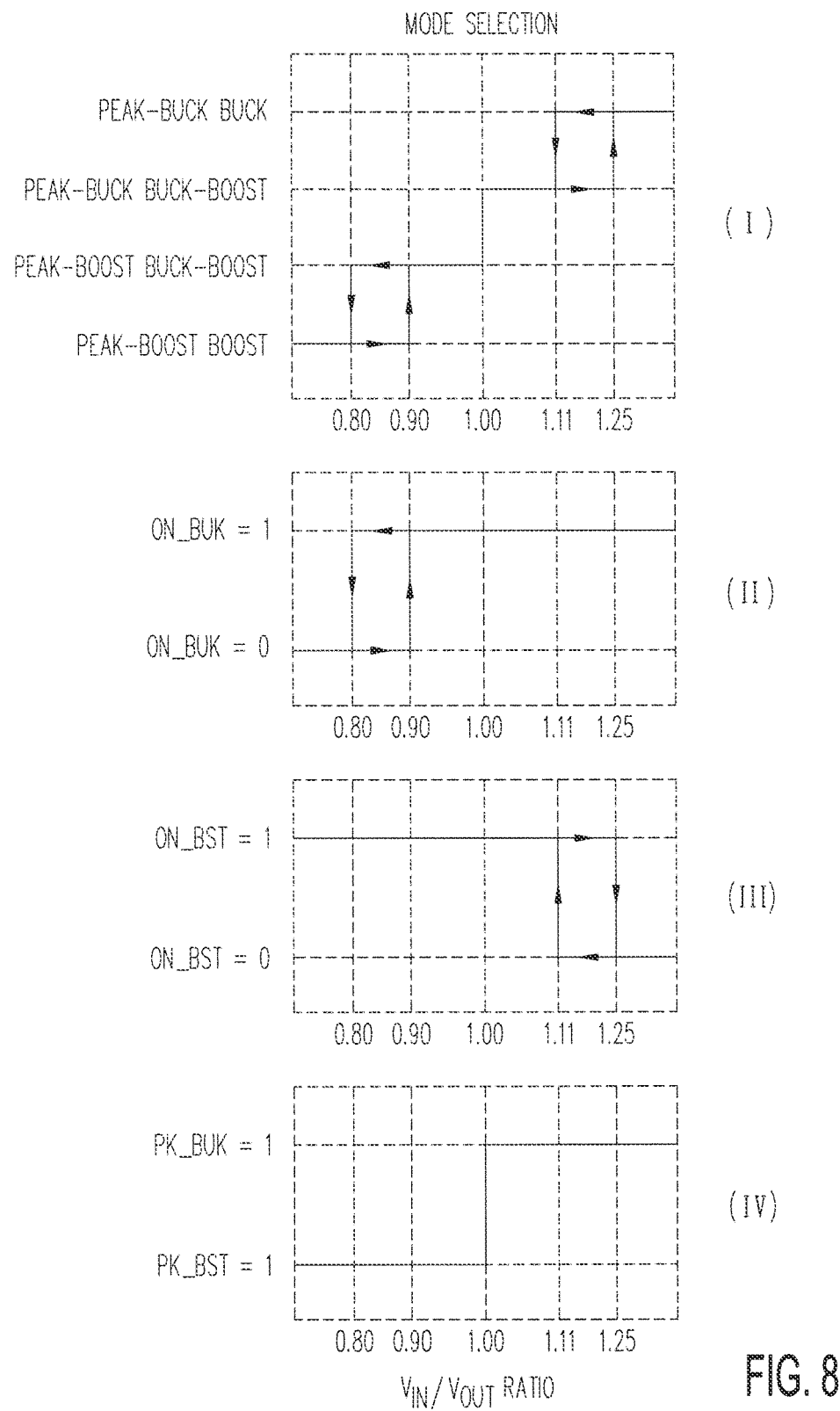
FIG. 8($i$) illustrates operating mode determination in selection circuit 720 and FIGS. 8($ii$)-8($iv$) show the logic values of control signals ON_BUK, ON_BST, PK_BUK and PK_BST, respectively, relative to the ratio $$\frac{V_{IN}}{V_{OUT}},$$

Based on the values of input signal $V_{IN}$ and output signal $V_{OUT}$, mode selection circuit 720 (FIG. 7) determines which of the aforementioned four operative modes to operate the regulator. The selected operating mode is communicated to the remainder of control circuit 700 by the states of the control signals ON_BST, ON_BUK, PK_BUK and PK_BST which are generated by mode selection circuit 720. FIG. 8(*i*) illustrates operating mode determination in selection circuit 720 and FIGS. 8(*ii*)-8(*iv*) show the logic values of control signals ON_BUK, ON_BST, PK_BUK and PK_BST, respectively, relative to the ratio $$\frac{V_{IN}}{V_{OUT}},$$

according to one embodiment of the present invention. Mode selection circuit 720 may include three comparators to generate control signals ON_BST, ON_BUK, PK_BUK and PK_BST, as control signals PK_BUK and PK_BST haVE complementary values. As shown in FIG. 8(*iv*), when ratio $$\frac{V_{IN}}{V_{OUT}}$$

is greater than 1, control signal PK_BUK is set to value '1' (and, correspondingly, control signal PK_BST is set to '0') and one of the two "peak-buck" current operating modes is activated. Conversely, when ratio $$\frac{V_{IN}}{V_{OUT}}$$

is less than 1, control signal PK_BST is set to value '1' (and, correspondingly, control signal PK_BUK is set to '0') and one of the two peak-boost current operating modes is activated. Control signal ON_BUK is set to '1' to indicate that a buck phase (i.e., during which both switches $S_B$ and $S_D$ are activated) is selected. Likewise, control signal ON_BST is set to '1' to indicate that a boost phase (i.e., during which both switches $S_A$ and $S_C$ are activated) is selected. As shown in FIG. 8, hysteresis is provided to avoid oscillation between mode transitions. For example, as shown in FIG. 8(*ii*), control signal ON_BUK remains at value '0' until the increasing ratio $$\frac{V_{IN}}{V_{OUT}}$$

reaches 0.9. Conversely, control signal ON_BUK remains at value '1' until the decreasing ratio $$\frac{V_{IN}}{V_{OUT}}$$

reaches 0.9. Similarly, as shown in FIG. 8(*iii*), control signal ON_BST remains at value '1' until the increasing ratio $$\frac{V_{IN}}{V_{OUT}}$$

reaches 1.25. Conversely, control signal ON_BST remains at value '0' until the decreasing ratio $$\frac{V_{IN}}{V_{OUT}}$$

reaches 1.11. As a result, mode transitions between "peak-buck buck mode" and "peak buck buck-boost mode" and between "peak-boost buck-boost mode" and "peak-boost boost mode" follow the hystereses in control signals ON_BST and ON_BUK, respectively.

As shown in FIG. 7, oscillator circuit 710 generates clock signals, CLK_A, CLK_B, and CLK_C, slope compensation signal $V_{SLP}$ and slope compensation offset signal $V_{OS}$. FIG. 9 shows waveforms of clock signals, CLK_A, CLK_B, and CLK_C, slope compensation signal $V_{SLP}$ and slope compensation offset signal $V_{OS}$, according to one embodiment of the present invention. As shown in FIG. 9, the rising edge of clock signal CLK_A marks the beginning of a switching period. The rising edge of clock signal CLK_C marks a 10% switching period delay, while the rising edge of clock CLK_B marks a 90% switching period delay. Compensation signal $V_{SLP}$ may be provided either as a linear slope compensation (solid trace) or as a nonlinear slope compensation (dashed trace). In either case, slope compensation offset signal $V_{OS}$ is provided as a voltage difference between the values of slope compensation signal $V_{SLP}$ at the 10% switching period delay and at the 90% switching period delay.

In each of regulator circuits 500 and 600, current $I_L$ in inductor L is sensed through sense resistor $R_S$. As shown in FIG. 7, amplifier 702 receives and amplifies (with a fixed gain) a differential signal represented by the difference between signals LSP and LSN to provide single-ended signal 703. Output voltage $V_{OUT}$ is sensed and scaled to provide feedback signal $V_{FB}$ by a voltage divider formed by resistors $R_{FB1}$ and $R_{FB2}$. Feedback signal $V_{FB}$ is provided to error amplifier 704, which generates an error signal $V_C$. Signal $V_C$ represents a voltage difference between reference signal $V_{REF}$ and feedback signal $V_{FB}$.

Compensation network 711 provides loop stability based on error signal $V_C$. The output signals from amplifier 702 and error amplifier 704, slope compensation signal $V_{SLP}$, and slope compensation offset signal $V_{OS}$ are provided to buck current comparator 705 and boost current comparator 706. According to the operating mode set by mode selection circuit 720, buck logic circuit 721 and boost logic circuit 722 provide control signals A, B, C and D, which are used to the respective control switches $S_A$, $S_B$, $S_C$, and $S_D$ in circuits 500 and 600.

The control schemes of the present invention are applicable to continuous conduction mode and pulse-skip and burst discontinuous conduction modes. FIG. 10 shows flow chart 1000 illustrating the operations of buck logic circuit 721 and boost logic circuit 722 of FIG. 7 under a continuous conduction mode, in accordance with one embodiment of the present invention.

FIGS. 12-17 show the waveforms of control signals CLK_A, CLK_B, CLK_C, A, B, C and D and current $I_L$ in inductor L, under various operating conditions, in accordance with one embodiment of the present invention. When control switch A, B, C or D is activated, the corresponding switch $S_A$, $S_B$, $S_C$ and $S_D$ is conducting. In each of these figures, the shoot-through protection dead times between control signals A and B, and between control signals C and D (which would be understood to be present by those of ordinary skill in the art) are not shown so as to simplify the detailed description herein.

As shown in FIG. 10, control signal CLK_A determines the timing of each cycle, which begins at the rising edge of control signal CLK_A (step 1002). Based on the determinations at steps 1003-1005, based on the logic values of control signals PK_BUK, PK_BST, ON_BST and ON_BUK control circuit 700 generates switch control signals A, B, C and D to operate switches $S_A$, $S_A$, $S_C$ and $S_D$. As mentioned above, when input voltage V is much higher than output voltage $V_{OUT}$ (PK_BUK='1', ON_BUK='1', and ON_BST='0'), the regulator is operated under the peak-buck buck mode, according to steps 10014-1015.

FIG. 12 shows the waveforms of control signals CLK_A, CLK_B, CLK_C, A, B, C and D and current $I_L$ in inductor L. Under this mode, switch control signal C is deactivated and switch control signal D is activated throughout the switching cycle. Switch control signals A and B are alternatingly activated and deactivated according to peak-buck current mode control. Specifically, at step 1014, switch control signal A is activated, leading to ramping up of inductor current k until the voltage difference between signals LSP and LSN (representing current $I_L$ in inductor L) reaches $V_C-V_{SLP}+V_{OS}$, at which time buck current comparator 705 transitions its output state. When that voltage threshold is reached, switch control signal A is deactivated and switch control signal B is activated (step 1015). This state is maintained until the beginning of the next switching cycle (step 1016).

When input voltage $V_{IN}$ is slightly higher than output voltage $V_{OUT}$, the regulator is operated under peak-buck buck-boost mode (PK_BUK='1', ON_BUK='1', and ON_BST='1') according to steps 1011-1013. FIG. 13 shows the waveforms of control signals CLK_A, CLK_B, CLK_C, A, B, C and D and current $I_L$ in inductor L, under peak-buck buck-boost mode. As shown in FIG. 13, at the beginning of the cycle (step 1011), switch control signals A and C are activated, and switch control signals B and D are deactivated, to provide a fixed boost phase to inductor current $I_L$. At step 1012, at the rising edge of control signal CLK_C (at the beginning 10% of the switching cycle), switch control signal C is deactivated and switch control signal D is activated to allow a slower ramp in inductor current $I_L$ until the voltage difference between signals LSP and LSN (representing current $I_L$ in inductor L) reaches $V_C-V_{SLP}+V_{OS}$, at which time buck current comparator 705 transitions its output state. When buck current comparator 705 transitions its output state, switch control signal A is deactivated and switch control signal B is activated until the beginning of the next switching cycle (step 1013).

When input voltage V is much lower than output voltage $V_{OUT}$ (PK_BST='1', ON_BUK='0', and ON_BST='1'), the regulator is operated under the peak-boost boost mode, according to steps 1006-1007. FIG. 14 shows the waveforms of control signals CLK_A, CLK_B, CLK_C, A, B, C and D and current $I_L$ in inductor L, under the peak-boost boost mode. As shown in FIG. 14, switch control signal A is activated and switch control signal B is deactivated for the entire switching cycle. At steps 1006-1007, switch control signals C and D are alternatingly activated and deactivated according to peak-boost current mode control. At the beginning of the cycle, i.e., at the rising edge of clock signal CLK_A, switch control signal C is activated to allow inductor current $I_L$ to ramp up. When the voltage difference between signals LSP and LSN (representing inductor current $I_L$) reaches $V_C-V_{SLP}$, boost current comparator 706 transitions its output state, switch control signal C is deactivated and switch control signal D is activated until the next switching cycle (step 1007).

When input voltage Vi is slightly lower than output voltage $V_{OUT}$ (PK_BST='1'. ON_BUK='1', and ON_BST='1'), the regulator is operated under a peak-boost buck-boost mode, according to steps 1008-1010. FIG. 15 shows the waveforms of control signals CLK_A, CLK_B, CLK_C, A, B, C and D and current $I_L$ in inductor L, under the peak-boost buck-boost mode. As shown in FIG. 15, switch control signal A is activated for the beginning 90% of the switching cycle (i.e., switch control signal A is activated at the rising edge of clock signal CLK_A and deactivated at the rising edge of clock signal CLK_B). At the beginning of the cycle (i.e., at the rising edge of clock signal CLK_A), both switch control signals A and C are activated according to step 1008, so that inductor current $I_L$ ramps up. When the voltage difference between signals LSP and LSN (representing inductor current $I_L$) reaches $V_C$-$V_{SLP}$, boost current comparator 706 transitions its output state. At that time, according to step 1009, switch control signal C is deactivated and switch control signal D is activated. At the rising edge of clock signal CLK B, i.e., at 90% of the cycle, switch control signal A is deactivated and switch control signal B is activated until the next switching cycle (step 1010).

In either peak-buck buck-boost mode (i.e., the operating condition of FIG. 13) or peak-boost buck-boost mode (i.e., the operating condition of FIG. 15). $V_{IN}$ may become equal to output voltage $V_{OUT}$. In either case, inductor current $I_L$ is flat when both switch control signals A and D are activated. FIG. 16 shows the waveforms of control signals CLK_A, CLK_B, CLK_C, A, B, C and D and current $I_L$ in inductor L, under the operating condition in which input voltage $V_{IN}$ is equal to output voltage $V_{OUT}$ in peak-buck buck-boost mode, in accordance one embodiment of the present invention. FIG. 17 shows the waveforms of control signals CLK_A, CLK_B, CLK_C, A, B, C and D and current $I_L$ in inductor L, under the operating condition in which input voltage $V_{IN}$ is equal to output voltage Vou in peak-boost buck-boost mode, in accordance one embodiment of the present invention. As buck current comparator 705 compares the voltage representing inductor current $I_L$ with the voltage sum of signals $V_C$ and $V_{OS}$, while boost current comparator 706 compares the voltage representing inductor current $I_L$ with of voltage of signal $V_C$, signal $V_C$ is stable regardless whether control transitions from peak-buck current mode control to peak-boost current mode control, or in the opposite direction. Thus, a regulator of the present invention has low-noise control transitions.

FIG. 11 shows flow chart 1100 illustrating the operations of buck logic circuit 721 and boost logic circuit 722 of FIG. 7 under a discontinuous conduction mode, in accordance with one embodiment of the present invention. According to FIG. 11, if inductor current $I_L$ falls below zero ("reverse current"; i.e., current flowing from the output side to the input side), all switch control signals may be deactivated to open all four switches during the peak-buck buck-boost mode or the peak-boost buck-boost mode (step 1102). Alternatively, in peak-buck buck mode, switch control signal B may be deactivated to open switch B (step 1103). Similarly, in peak-boost boost mode, switch control signal D may be deactivated to open switch D (step 1101).

The above detailed description is provided to illustrate the specific embodiments of the present invention and is not intended to be limiting. Numerous variations and modifications within the scope of the present invention are possible. The present invention is set forth in the claims.

The invention claimed is:

1. Control circuitry, for providing output voltage regulation between an input node and an output node in a buck boost voltage regulator comprising buck bridge switches, boost bridge switches, an inductor, and a sense resistor coupling the inductor to the buck bridge switches, the control circuitry comprising:
    an inductor current sensing circuit, including a first input coupled to a first terminal of the sense resistor at the buck bridge switches, and a second input coupled to a second terminal of the sense resistor at the inductor, the inductor current sensing circuit generating an inductor current feedback signal for each of forward and reverse direction inductor currents, the inductor current feedback signal controlling both continuous conduction and discontinuous conduction operation of the buck-boost voltage regulator;
    a current mode control circuit, coupled to the inductor current sensing circuit to receive the inductor current feedback signal for controlling operation of the buck-boost voltage regulator in a peak current mode (i) actively controlling the buck bridge switches when an input voltage at the input node exceeds an output voltage at the output node, and (ii) actively controlling the boost bridge switches when the output voltage at the output node exceeds the input voltage at the input node; and
    an oscillator circuit generating (i) a first clock signal having a rising edge that represents a beginning of a full duty cycle, (ii) a second clock signal having a rising edge that represents a maximum duty cycle of a first buck bridge switch, (iii) a third clock signal having a rising edge that represents a minimum duty cycle of a first boost bridge switch, (iv) a slope compensation signal in synchronization with the first clock signal, and (v) a slope compensation offset signal based on a voltage difference of the slope compensation signal between the rising edges of the second and the third clock signals.

2. The control circuitry of claim 1, wherein the maximum duty cycle of the first buck bridge switch is 90% of the full duty cycle.

3. The control circuitry of claim 1, wherein the minimum duty cycle of the first boost bridge switch is 10% of the full duty cycle.

4. The control circuitry of claim 1, further comprising:
    a mode selection circuit using a ratio of the input voltage and the output voltage at the minimum and maximum duty cycles to generate mode control signals representing (a) a first control state in which the ratio is greater than a reciprocal of the maximum duty cycle, (b) a second control state in which the ratio is greater than 1, but less than the reciprocal of the maximum duty cycle, (c) a third control state in which the ratio is less than 1, but greater than a complement of the minimum duty cycle (d) a fourth control state in which the ratio is less than the complement of the minimum duty cycle.

5. The control circuitry of claim 4, further comprising:
    a switch control circuit generating control signals based on an output from the mode selection circuit for operating the buck bridge switches and the boost bridge switches in one of:
    (a) a buck mode, in which (1) the buck bridge switches are alternatively activated and deactivated by a peak buck current mode control scheme and (2) the first boost bridge switch is deactivated for the full duty cycle and a second boost bridge switch is activated for the full duty cycle;
    (b) a peak-buck buck-boost mode, in which (1) the buck bridge switches are activated and deactivated by the peak buck current mode control scheme and (2) the first boost bridge switch is activated for the minimum duty cycle and the second boost bridge switch is activated for a remainder of the full duty cycle;
    (c) a peak-boost buck-boost mode, in which (1) the boost bridge switches are activated and deactivated by a peak boost current mode control scheme and (2) the first buck bridge switch is activated for the maximum duty cycle and a second buck bridge switch is activated for a remainder of the full duty cycle; and (d) a boost mode, in which (1) the boost bridge switches are alternatively activated and deactivated by the peak boost current mode control scheme and (2) the first buck bridge switch is activated for the full duty cycle and the second buck bridge switch is deactivated for the full duty cycle.

6. The control circuitry of claim 4, wherein the output voltage is provided as a scaled feedback signal to the mode selection circuit.

7. The control circuitry of claim 5, further comprising:
an error amplifier circuit generating an error signal based on a difference between a reference voltage and a feedback signal based upon the output voltage at the output node; and a compensation network, in a feedback loop with the error amplifier circuit, for loop stabilization.

8. The control circuitry of claim 7, wherein the mode selection circuit is configured to provide hysteresis for transitioning between the first control state and the second control state, or for transitioning between the third control state and the fourth control state.

9. The control circuitry of claim 7, comprising a switch control signal generation circuit, connected to the mode selection circuit, the switch control signal generation circuit comprising a comparator to determine a peak value of a current flowing in the inductor using a ramping voltage, the inductor current feedback signal, and the error signal.

10. The control circuitry of claim 9, wherein the error signal is based on an amplified difference between the reference voltage and the output voltage.

11. The control circuitry of claim 9, further comprising a compensation circuit receiving the error signal for providing loop stability.

12. The control circuitry of claim 9, wherein the comparator comprises a first comparator that controls the buck bridge switches.

13. The control circuitry of claim 9, wherein the comparator comprises a second comparator that controls the boost bridge switches.

14. A method of providing output voltage regulation between an input node and an output node in a buck-boost voltage regulator comprising buck bridge switches, boost bridge switches, an inductor, and a sense resistor coupling the inductor to the buck bridge switches, the method comprising:
using an inductor current sensing circuit, including a first input coupled to a first terminal of the sense resistor at the buck bridge switches, and a second input coupled to a second terminal of the sense resistor at the inductor, the inductor current sensing circuit generating an inductor current feedback signal for each of forward and reverse direction inductor currents, the inductor current feedback signal controlling both continuous conduction and discontinuous conduction operation of the buck-boost voltage regulator;
using a current mode control circuit, coupled to the inductor current sensing circuit to receive the inductor current feedback signal for controlling operation of the buck-boost voltage regulator in a peak current mode (i) actively controlling the buck bridge switches when an input voltage at the input node exceeds an output voltage at the output node, and (ii) actively controlling the boost bridge switches when the output voltage at the output node exceeds the input voltage at the input node; and determining a mode of operation using a ratio of the input voltage over the output voltage related to minimum and maximum duty cycles to generate mode control signals representing (a) a first control state in which the ratio is greater than a reciprocal of a maximum duty cycle, (b) a second control state in which the ratio is greater than 1, but less than the reciprocal of the maximum duty cycle, (c) a third control state in which the ratio is less than 1, but greater than a complement of a minimum duty cycle (d) a fourth control state in which the ratio is less than the complement of the minimum duty cycle.

15. The method of claim 14 further comprising:
generating a first clock signal having a first rising edge that represents a beginning of a full duty cycle;
generating a second clock signal having a second rising edge that represents the maximum duty cycle of a first buck bridge switch;
generating a third clock signal having a third rising edge that represents the minimum duty cycle of a first boost bridge switch;
generating a slope compensation signal in synchronization with the first clock signal; and
generating a constant slope compensation offset signal based on a voltage difference of the slope compensation signal between the second rising edge and the third rising edge.

16. The method of claim 15, further comprising:
generating control signals for operating the buck bridge switches and the boost bridge switches in one of:
(a) a buck mode, in which (1) the buck bridge switches are alternatively activated and deactivated by a peak buck current mode control scheme and (2) the first boost bridge switch is deactivated for the full duty cycle and a second boost bridge switch is activated for the full duty cycle;
(b) a peak-buck buck-boost mode, in which (1) the buck bridge switches are activated and deactivated by the peak buck current mode control scheme and (2) the first boost bridge switch is activated for the minimum duty cycle and the second boost bridge switch is activated for a remainder of the full duty cycle;
(c) a peak-boost buck-boost mode, in which (1) the boost bridge switches are activated and deactivated by a peak boost current mode control scheme and (2) the first buck bridge switch is activated for the maximum duty cycle and a second buck bridge switch is activated for the remainder of the full duty cycle; and
(d) a boost mode, in which (1) the boost bridge switches are alternatively activated and deactivated by the peak boost current mode control scheme and (2) the first buck bridge switch is activated for the full duty cycle and the second buck bridge switch is deactivated for the full duty cycle.

17. The method of claim 14, comprising selecting between modes based at least in part on an error signal based on a difference between a reference voltage and the output voltage.

18. The method of claim 17, further comprising stabilizing a feedback loop in the buck-boost voltage regulator using the error signal.

19. Control circuitry, for providing output voltage regulation between an input node and an output node in a buck-boost voltage regulator comprising buck bridge switches, boost bridge switches, an inductor, and a sense resistor coupling the inductor to the buck bridge switches, the control circuitry comprising:

a means for selecting a current mode control scheme that works in either continuous conduction mode or discontinuous conduction mode, the means for selecting including using:

an inductor current sensing circuit, including a first input coupled to a first terminal of the sense resistor at the buck bridge switches, and a second input coupled to a second terminal of the sense resistor at the inductor, the inductor current sensing circuit generating an inductor current feedback signal for each of forward and reverse direction inductor currents, the inductor current feedback signal controlling both continuous conduction and discontinuous conduction operation of the buck-boost voltage regulator;

a current mode control circuit, coupled to the inductor current sensing circuit to receive the inductor current feedback signal for controlling operation of the buck-boost voltage regulator in a peak current mode (i) actively controlling the buck bridge switches when an input voltage at the input node exceeds an output voltage at the output node, and (ii) actively controlling the boost bridge switches when the output voltage at the output node exceeds the input voltage at the input node; and an oscillator circuit generating (i) a first clock signal having a rising edge that represents a beginning of a full duty cycle, (ii) a second clock signal having a rising edge that represents a maximum duty cycle of a first buck bridge switch, (iii) a third clock signal having a rising edge that represents a minimum duty cycle of a first boost bridge switch, (iv) a slope compensation signal in synchronization with the first clock signal, and (v) a slope compensation offset signal based on a voltage difference of the slope compensation signal between the rising edges of the second and the third clock signals.

* * * * *